United States Patent
Park et al.

(10) Patent No.: US 7,356,016 B2
(45) Date of Patent: Apr. 8, 2008

(54) SYSTEM AND METHOD FOR DELETING TUNNELLING IN CONNECTION BETWEEN MOBILE NODE AND CORRESPONDENT NODE

(75) Inventors: Soo-hong Park, Yongin-si (KR); Young-keun Kim, Incheon Maetropolitan (KR); Pyung-soo Kim, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 707 days.

(21) Appl. No.: 10/842,578

(22) Filed: May 11, 2004

(65) Prior Publication Data

US 2004/0228335 A1 Nov. 18, 2004

(30) Foreign Application Priority Data

May 12, 2003 (KR) ............... 10-2003-0029757

(51) Int. Cl.
*H04B 7/216* (2006.01)
(52) U.S. Cl. ............ 370/342; 370/352; 370/313; 455/439
(58) Field of Classification Search ......... 370/313, 370/342, 352; 455/439; 709/230, 222, 226, 709/229
See application file for complete search history.

(56) References Cited

U.S. PATENT DOCUMENTS

| | | | |
|---|---|---|---|
| 6,961,321 B1* | 11/2005 | Okanoue et al. | 370/313 |
| 7,162,529 B2* | 1/2007 | Morishige et al. | 709/230 |
| 2002/0049059 A1* | 4/2002 | Soininen et al. | 455/439 |

\* cited by examiner

*Primary Examiner*—Joseph Feild
*Assistant Examiner*—Phuoc Doan
(74) *Attorney, Agent, or Firm*—Sughrue Mion, PLLC

(57) ABSTRACT

Provided are a system and method for deleting tunneling when a correspondent node is connected to a mobile node that has moved to a different network. The system includes a domain name service server, a mobile node that moves to a different network, a domain name dynamic updating server, and a correspondent node. The domain name service server manages domain names and address of a plurality of mobile nodes. Once the domain name dynamic update server receives a message including the created address by the mobile node, the domain name dynamic update server updates domain name and address of the mobile node that are registered in the domain name service server using the domain name and address contained in the received message. The correspondent node connects to the domain name service server, obtains the updated address of the mobile node, and transmits a packet to the mobile node using the obtained address.

12 Claims, 9 Drawing Sheets

SYSTEM AND METHOD FOR DELETING TUNNELLING IN CONNECTION BETWEEN MOBILE NODE AND CORRESPONDENT NODE

This application claims the priority of Korean Patent Application No. 2003-29757, filed on May 12, 2003, in the Korean Intellectual Property Office, the disclosure of which is incorporated herein in its entirety by reference.

BACKGROUND OF THE INVENTION

1. Field of the Invention

The present invention relates to a connection between a mobile node and a correspondent node in mobile communications networks, and more particularly, to a system and a method for deleting tunnelling when a correspondent node is connected to a mobile node that has moved to a different network (or foreign network).

2. Description of the Related Art

A mobile node (also called an MN) is a host or router that can change its network connection location. A correspondent node (also called a CN) is a host or router that communicates with the mobile node.

When the mobile node moves to a different network, it automatically creates a new address. The created address is referred to as a care of address (hereinafter, referred to as a COA). When an address of the mobile node in a home network is referred to as a home address. Both the COA and the home address are Internet protocol (hereinafter, referred to as IP) addresses of the mobile node, but they have different network prefix information.

When the mobile node creates the COA, a home agent (hereinafter, referred to as an HA) of the home network of the mobile node binds the COA with the home address of the mobile node, thereby managing an address of the mobile node. At this time, an IP address of the mobile node, which is registered in a domain name service (hereinafter, referred to as a DNS) server, is the home address.

Hence, when a new correspondent node attempts to connect to the mobile node that has moved to the different network, the correspondent node obtains the home address of the mobile node from the DNS server. As a result, a packet destined to the mobile node by the correspondent node is intercepted by the home agent and is then tunneled to a current location of the mobile node.

FIG. 1 illustrates a network environment for explaining a conventional method for connecting between a mobile node and a correspondent node when a new correspondent node attempts to connect to a mobile node that has moved to a different network.

A subnet 1 of FIG. 1 is a home network of a mobile node MN. The home network can communicate with a correspondent node using a home address of the mobile node MN. A subnet 2 is any one of a plurality of different networks.

When the mobile node MN moves from the home network, i.e., the subnet 1, to the different network, i.e., the subnet 2, it creates a new COA having a network prefix of the subnet 2. The mobile node MN notifies a home agent HA of the subnet 1 of the created COA. The home agent HA of the subnet 1 binds the created COA of the subnet 2 with the home address of the mobile node MN of the subnet 1, thereby managing an address of the mobile node MN.

While the home agent HA of the subnet 1 manages the address of the mobile node MN, if a new correspondent node CN transmits a DNS query message including a domain name of the mobile node MN to a DNS server 100 so as to connect to the mobile node MN, the DNS server 100 transmits a DNS reply message including an IP address corresponding to the domain name to the new correspondent node CN.

Thus, the new correspondent node CN obtains the IP address of the mobile node MN. However, as pointed out above, the obtained IP address of the mobile node MN is the home address of the mobile node MN. Thus, if the new correspondent node CN transmits a packet using the obtained IP address, the home agent HA of the subnet 1 intercepts the packet and transmits the packet to the mobile node MN connected to the subnet 2 by means of tunneling.

After receiving the tunneled packet, the mobile node MN determines that the new correspondent node CN has no binding information, then transmits a binding update message to the new correspondent node CN, and performs a route optimization process which notifies the new correspondent node CN of the COA of the mobile node MN. After completion of the route optimization process, the mobile node MN and the new correspondent node CN can directly transmit and receive the packet without involving the home agent HA of the subnet 1.

As such, according to prior art, when the new correspondent node CN attempts to connect to the mobile node MN that has moved to the different network, the home agent HA intercepts a packet and transmits the packet to the location of the mobile node MN by means of tunnelling. Such packet transmission is inefficient in terms of use of a packet transmission path. This inefficiency becomes serious when a plurality of correspondent nodes CN attempts to connect to the mobile node MN. This is because the home agent HA intercepts all packets delivered by the plurality of correspondent nodes CN and tunnels the packets to the mobile node MN.

Also, if the mobile node MN receives the tunneled packets, route optimization between the correspondent node CN and the mobile node MN must be carried out, so that the packets can be transmitted and received directly between the correspondent node CN and the mobile node MN. According to prior art, a plurality of packets must be transmitted so as to provide a network environment where packet transmission is performed directly between the correspondent node CN and the mobile node MN that has moved to the different network.

SUMMARY OF THE INVENTION

The present invention provides a system and a method for deleting tunneling that is caused by home agent's interception of packets transmitted from a new correspondent node when the new correspondent node desires to connect to a mobile node that has moved to a different network.

According to one aspect of the present invention, there is provided a domain name dynamic update server which can be connected to a domain name service server and one or more mobile nodes, the domain name dynamic update server comprising a message receiving unit receiving a duplicate address detection request message that is generated from a mobile node when the mobile node moves to a different network; a duplicate use determining unit determining whether a domain name and/or an address contained in the duplicate address detection request message are used in the different network; and an updating unit updating the domain name and/or the address of the mobile node that are registered in the domain name service server if the domain name and/or the address are not used in the different network.

According to another aspect of the present invention, there is provided a mobile node which can be connected to a domain name service server, the mobile node comprising an address creating unit creating an address having a prefix of a different network when the mobile node moves to the different network; a duplicate address detection performing unit, after receiving the address from the address creating unit, forming a duplicate address detection request message using a predetermined domain name and the address, multicasting the duplicate address detection request message to the different network, and determines whether the address is used in the different network; and a dynamic updating unit, if the address is not used in the different network, updating an address of the mobile node registered in a domain name service server using the predetermined domain name and the address.

According to another aspect of the present invention, there is provided a system for deleting tunnelling in a connection between a mobile node and a correspondent node, the system comprising a domain name service server managing domain names and addresses of a plurality of mobile nodes; a mobile node; a domain name dynamic updating server, when a message including an address created by the mobile node is received as the mobile node moves to a different network, updating an address of the mobile node that is registered in the domain name service server, using a domain name and the address included in the received message; and a correspondent node obtaining the updated address of the mobile node from the domain name service server and transmitting a packet to the mobile node using the obtained address.

According to another aspect of the present invention, there is provided a system for deleting tunnelling in a connection between a mobile node and a correspondent node, the system comprising a domain name service server managing domain names and addresses of a plurality of mobile nodes; a mobile node updating an address of the mobile node registered in the domain name service server using a predetermined domain name and an address created by the mobile node by moving the mobile node to a different network; and a correspondent node obtaining the updated address of the mobile node from the domain name service server and transmitting a packet to the mobile node using the obtained address.

According to another aspect of the present invention, there is provided a method for updating a domain name and an address of a mobile node in a network which includes one or more mobile nodes and a domain name service server, the method comprising receiving a duplicate address detection request message that is generated from a mobile node as the mobile node moves to a different network; determining whether a domain name and/or an address contained in the duplicate address detection request message are used in the different network; and updating the domain name and the address of the mobile node that are registered in a domain name service server using the domain name and the address contained in the duplicate address detection request message, if the domain name and/or the address are not used in the different network.

According to another aspect of the present invention, there is provided a method for deleting tunnelling in a connection between a mobile node and a correspondent node, the method comprising creating an address of the mobile node having a prefix of a different network when a mobile node moves to the different network; updating the address and the domain name of the mobile node that are registered in a domain name service server using the created address and a previously assigned domain name of the mobile node; obtaining the updated address from the domain name service server by the correspondent node; and transmitting a packet from the correspondent node to the mobile node using the obtained address.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF THE ILLUSTRATIVE, NON-LIMITING EMBODIMENTS OF THE INVENTION

Figure 1:
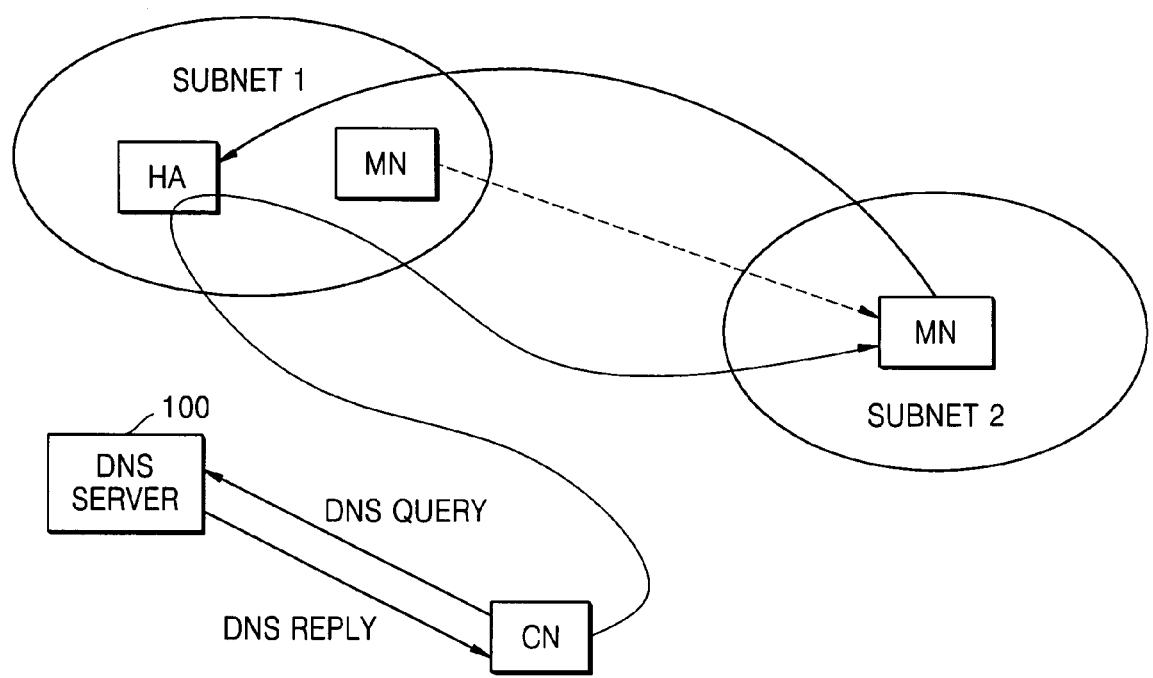
FIG. 1 illustrates a network environment for explaining a conventional connection method between a mobile node and a correspondent node.
Figure 2:
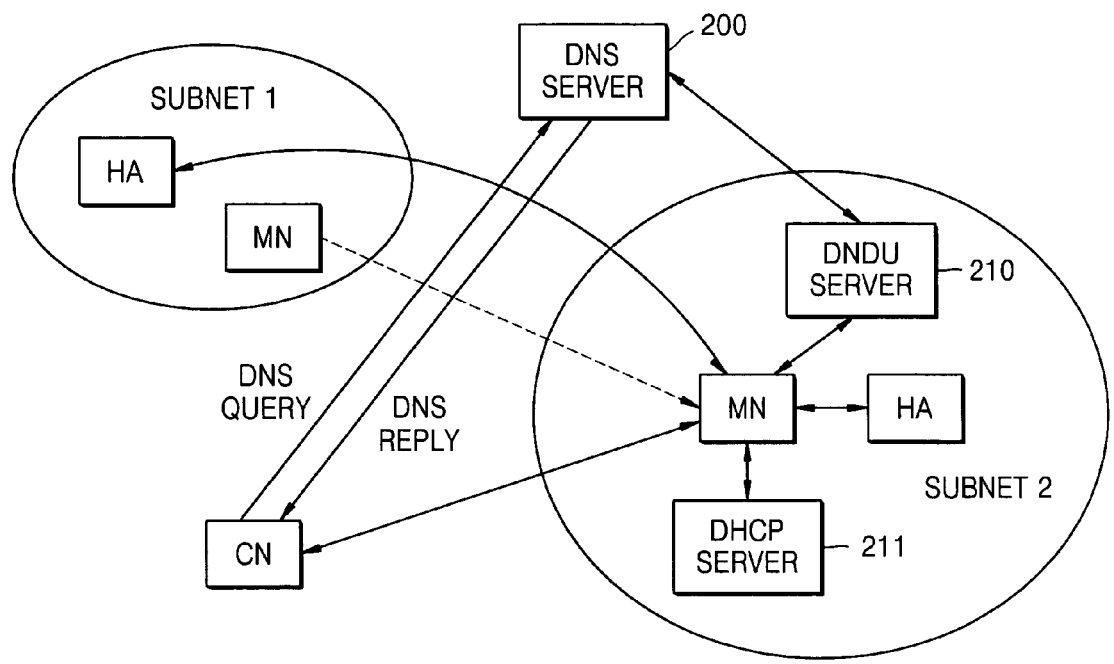
FIG. 2 illustrates a network environment to which an embodiment of the present invention is applied.

FIG. 2 illustrates a network environment to which an embodiment of the present invention is applied. In FIG. 2, a subnet I is a home network of a mobile node MN, and a subnet 2 is a different network or a foreign network of the mobile mode MN. A correspondent node CN is a new node that desires communication with the mobile node MN.

A domain name service (hereinafter, referred to as a DNS) server 200 of FIG. 2 manages a domain name and an Internet protocol (hereinafter, referred to as an IP) address of the mobile node MN. The DNS server 200 manages domain names and IP addresses of a plurality of mobile nodes (not shown) in addition to the mobile node MN.

When the mobile node MN creates a new care of address (hereinafter, referred to as a COA) as the mobile node MN moves to a different network, i.e., the subnet 2, a domain name dynamic update (hereinafter, referred to as a DNDU) server 210 of FIG. 2 dynamically updates the domain name and the IP address of the mobile node MN, registered in the DNS server 200, using the created COA. At this time, the DNDU server 210 checks if the created COA is used in the subnet 2. If the created COA is not used in the subnet 2, the DNDU server 210 dynamically performs the update for the domain name and the IP address of the mobile node MN. The created COA has prefix information of a network in which the mobile node MN currently resides (e.g., the subnet 2 of FIG. 2).

Figure 3:
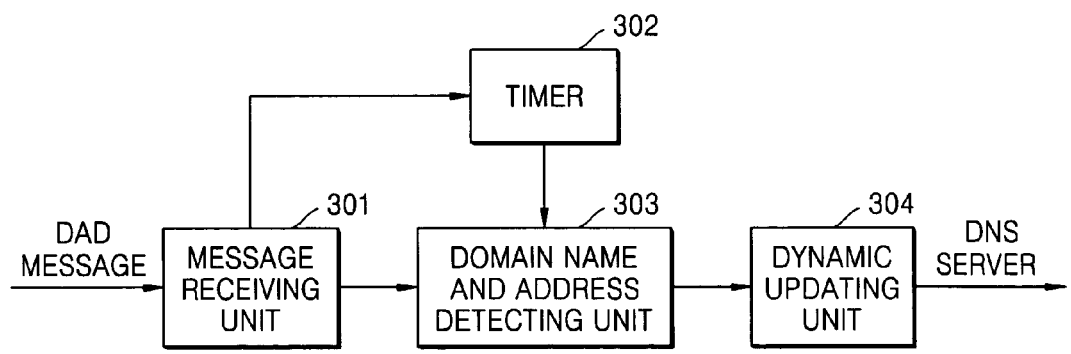
FIG. 3 illustrates a configuration of a domain name dynamic update (DNDU) server used in a system according to an embodiment of the present invention.

The DNDU server 210 can be configured as shown in FIG. 3. FIG. 3 illustrates a configuration of a DNDU server used in a system for deleting tunnelling according to an embodiment of the present invention. Referring to FIG. 3, the DNDU server 210 includes a message receiving unit 301, a timer 302, a domain name and address detecting unit 303, and a dynamic updating unit 304.

The message receiving unit 301 receives a message that is multicasted (or broadcasted) by the mobile node MN. This message is a duplicate address detection (hereinafter, referred to as a DAD) request message.

Once the message receiving unit 301 receives the DAD request message, the timer 302 is reset. Time data is generated according to the operation of the timer 302 and is provided to the domain name and address detecting unit 303.

If the time data provided by the timer 302 is equal to a predetermined time, the domain name and address detecting unit 303 determines that a domain name and/or IP address contained in the DAD request message are not used in the subnet 2.

If the domain name and/or IP address are not used in the subnet 2, the domain name and address detecting unit 303 detects the domain name and IP address contained in the DAD request message and outputs the detected domain name and IP address to the dynamic updating unit 304.

After receiving the domain name and IP address, the dynamic updating unit 304 dynamically updates a domain name and an IP address of the mobile node MN, registered in the DNS server 200, using the received domain name and IP address. At this time, the dynamic updating unit 304 can use a dynamic update protocol prescribed in an IETF specification.

Figure 4:
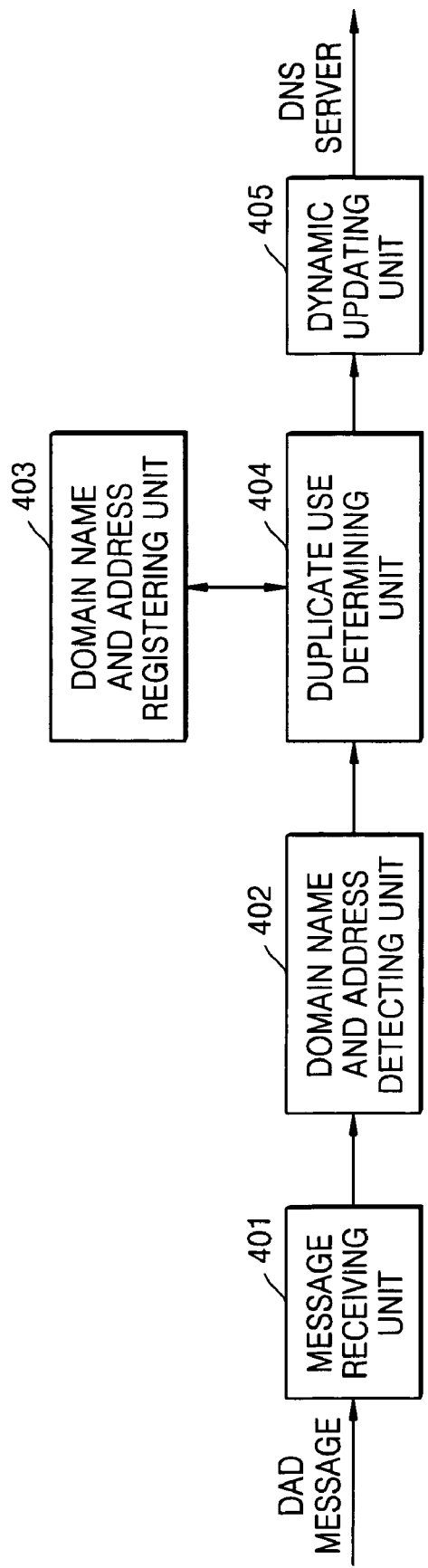
FIG. 4 illustrates another configuration of a DNDU server used in a system according to an embodiment of the present invention.

FIG. 4 illustrates another configuration of the DNDU server 210 used in a system according to the present invention. Referring to FIG. 4, the DNDU server 210 includes a message receiving unit 401, a domain name and address detecting unit 402, a domain name and address registering unit 403, a duplicate use determining unit 404, and a dynamic updating unit 405.

The message receiving unit 401 receives a DAD request message transmitted from the mobile node MN. The message receiving unit 401 outputs the received DAD request message to the domain name and address detecting unit 402.

The domain name and address detecting unit 402 detects a domain name and an IP address contained in the DAD request message received from the message receiving unit 401. The domain name is transmitted using an option field, and the IP address is transmitted using a target address field. Thus, the domain name and address detecting unit 402 detects the domain name contained in the optical field and the IP address contained in the target address field.

Domain names and IP addresses of all mobile nodes (not shown) connected to the subnet 2 are registered in the domain name and address registering unit 403. The domain names and IP addresses are registered when it is determined that the domain name and address contained in the DAD request message transmitted from the mobile node MN connected to the subnet 2 are not used in the subnet 2.

The duplicate use determining unit 404 checks if the domain name and/or IP address output from the domain name and address detecting unit 402 are used. In other words, after the duplicate use determining unit 404 receives the domain name and IP address from the domain name and address detecting unit 402, the duplicate use determining unit 404 checks if the received domain name and/or IP address are included in the domain name and address registering unit 403.

If the domain name and/or IP address are included in the domain name and address registering unit 403, the duplicate use determining unit 404 determines that the received domain name and/or IP address have already been used in the subnet 2. That is the duplicate use determining unit 404 determines that the domain name and/or IP address are duplicated in the subnet 2. Thus, the duplicate use determining unit 404 does not request the dynamic updating unit 405 to dynamically update the received domain name and IP address.

However, if the domain name and/or IP address are not included in the domain name and address registering unit 403, the duplicate use determining unit 404 determines that the received domain name and/or IP address are not used in the subnet 2. Thus, the duplicate use determining unit 404 requests the dynamic updating unit 405 to dynamically update the received domain name and IP address.

If the duplicate use determining unit 404 requests the dynamic updating unit 405 to perform dynamic update, the dynamic updating unit 405 dynamically updates the domain name and IP address of the mobile node MN, registered in the DNS server 200, using the received domain name and IP address in the same manner as the dynamic updating unit 304 of FIG. 3.

After moving to the different network, i.e., the subnet 2, the mobile node MN of FIG. 2 creates a new COA having a network prefix of the subnet 2, forms a DAD request message using the created COA, and multicasts the created DAD request message to the subnet 2.

After the mobile node MN multicasts the DAD request message, if a reply message is not received, the mobile node MN determines that the domain name and IP address contained in the DAD request message are not used in the subnet 2, registers the COA as its own address, and notifies the home agent HA of the subnet 1 of the COA.

Figure 5:
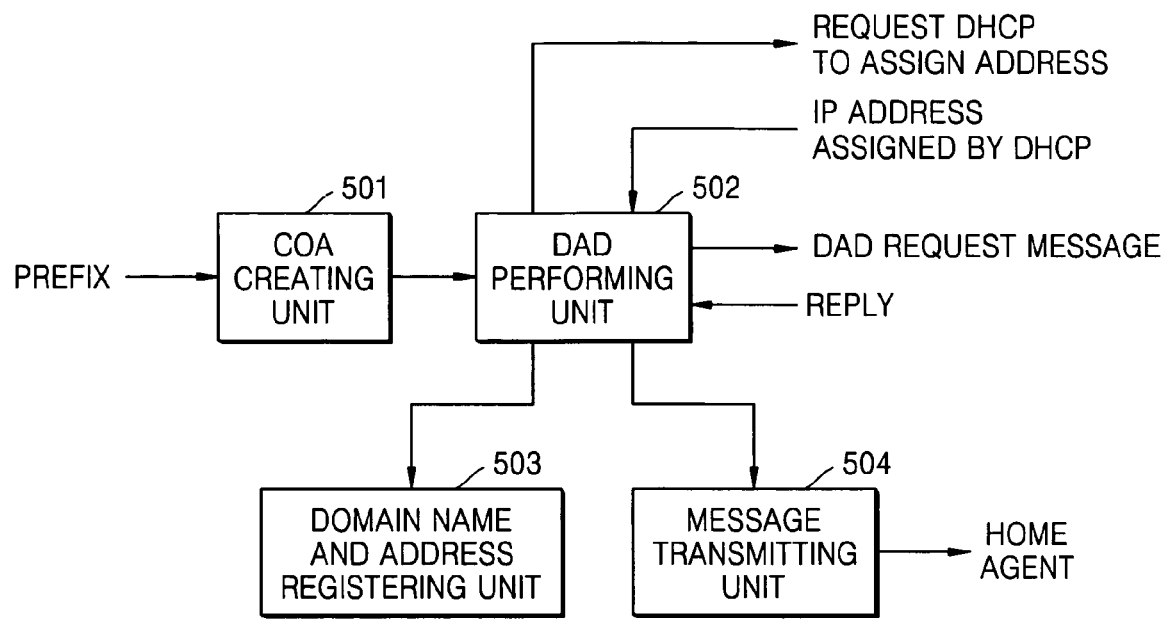
FIG. 5 illustrates a configuration of a mobile node (MN) used in a system according to an embodiment of the present invention.
Figure 6:
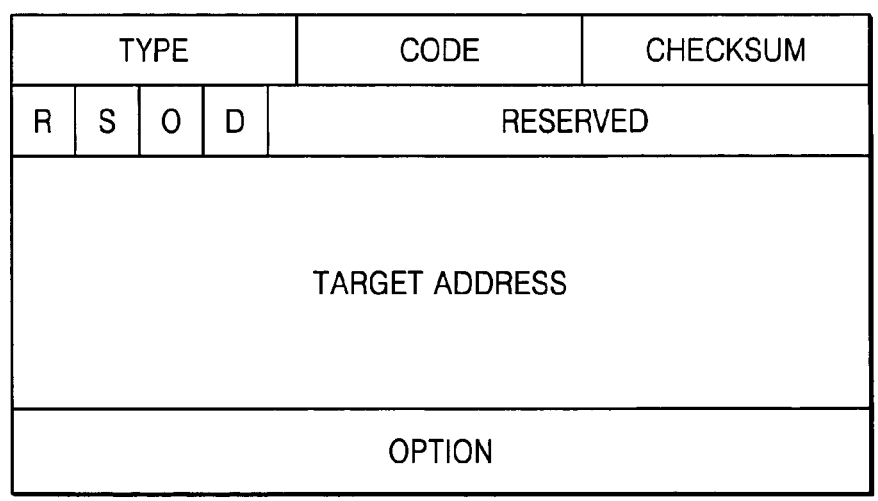
FIG. 6 illustrates a data format of a duplicate address detection (DAD) request message generated by DAD of the mobile node (MN) of FIG. 5.

For the above-described operation, the mobile node MN is configured as shown in FIG. 5. Referring to FIG. 5, the mobile node MN includes a COA creating unit 501, a DAD performing unit, a domain name and address registering unit 503, and a message transmitting unit 504.

After receiving a network prefix from a home agent (HA) of the subnet 2, the COA creating unit 501 creates a COA having the network prefix of the home agent. The COA contains the network prefix and interface identification information of the mobile node MN. The COA creating unit 501 outputs the created COA to the DAD performing unit 502.

The DAD performing unit 502 forms a DAD request message containing the created COA and the domain name of the mobile node MN. For example, the DAD request message can be created such that the domain name is contained in an option field of a router solicitation (RS) message and the COA is contained in a target address field of the RS message. The DAD performing unit 502 multicasts the DAD request message to the subnet 2.

If the reply message to the DAD request message is not received even after a predetermined amount of time has passed, the DAD performing unit 502 determines that the domain name and IP address contained in the DAD request message are not used in the subnet 2.

If the domain name and IP address are not used, the DAD performing unit 502 notifies the home agent HA of the subnet 1 of the COA by way of the message transmitting unit 504 while registering the created COA and the domain name in the domain name and address registering unit 503. Thus, the home agent HA of the subnet 1 binds the COA with the home address of the mobile node MN.

However, if the reply message is received after the DAD request message is multicasted to the subnet 2, the DAD performing unit 502 determines that the domain name and IP address contained in the DAD request message are used. If the domain name and IP address are used in the subnet 2, the DAD performing unit 502 requests a dynamic host configuration protocol (hereinafter, referred to as a DHCP) server 211 connected to the subnet 2 to assign an address.

The DHCP server 211 assigns a new IP address to the mobile node MN and transmits the assigned IP address to the mobile node MN. Subsequently, the DAD performing unit 502 of the mobile node MN receives the assigned IP address, creates a DAD request message using the received new address, and multicasts the created DAD request message to the subnet 2. The DHCP server 211 can also assign a new domain name to the mobile node MN.

By means of the above-described operations of the DNDU server 210 and the mobile node MN, a domain name and an IP address corresponding to a current location of the mobile node MN in the subnet 2 is registered in the DNS server 200.

Here, if the correspondent node CN sends the DNS query message to the DNS server 200 to connect to the mobile node MN, the DNS server 200 provides the correspondent node CN with the DNS reply message having the IP address of the mobile node MN in the subnet 2.

Thus, the correspondent node CN directly transmits a packet to the mobile node MN in the subnet 2 using the provided IP address. Since the mobile node MN directly transmits a packet to the correspondent node CN using the IP address contained in the received packet, it is not necessary to perform route optimization between the correspondent node CN and the mobile node MN.

Figure 7:
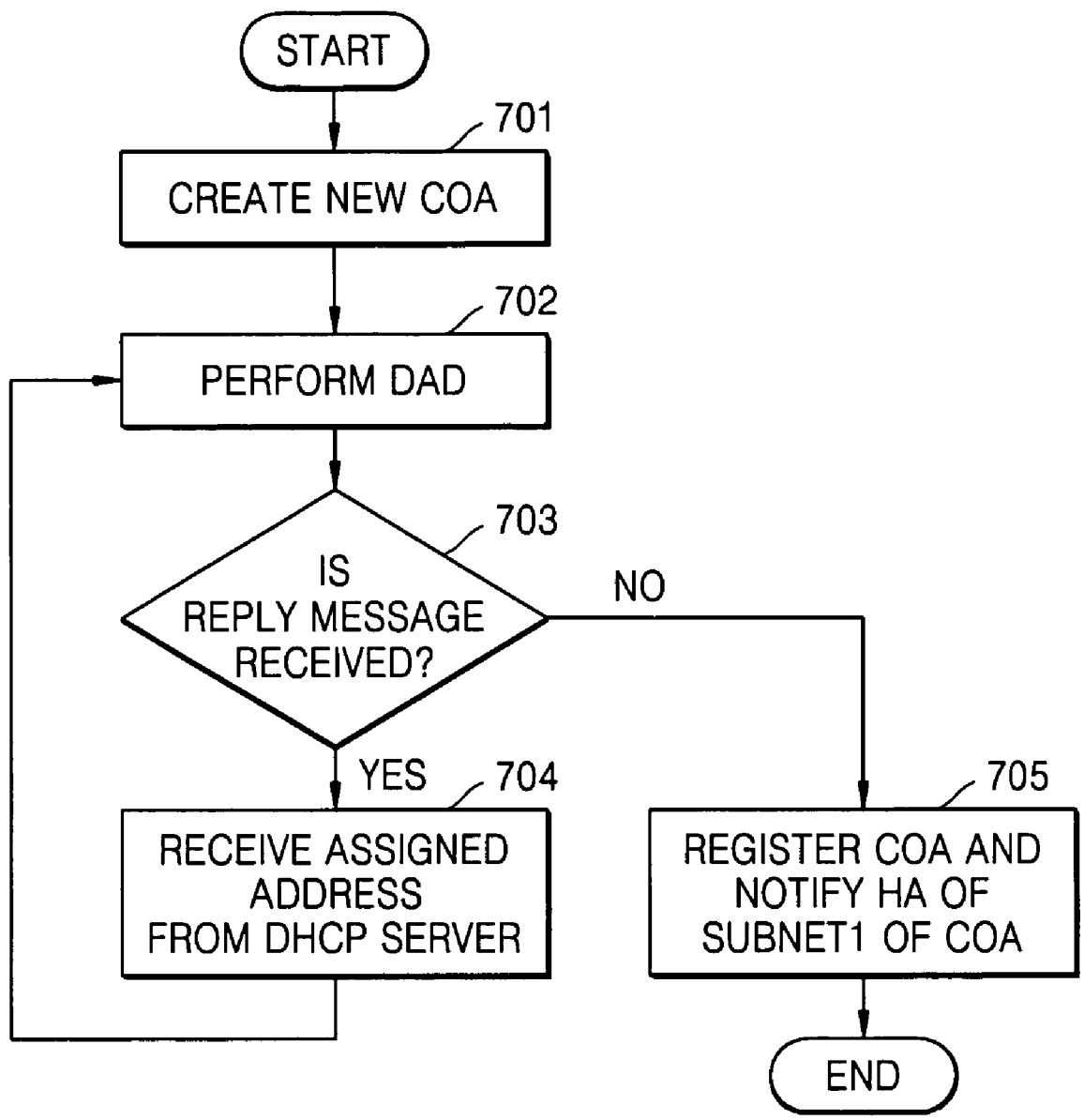
FIG. 7 is a flowchart of the operation of the mobile node (MN) in a method for deleting tunneling in a connection between a mobile node (MN) and a correspondent node (CN) according to an embodiment of the present invention.

FIG. 7 is a flowchart of the operation of the mobile node MN in a method for deleting tunneling in a connection between the mobile node MN and the correspondent node CN according to an embodiment of the present invention in the network environment of FIG. 2.

When the mobile node MN moves to the different network or the foreign network, i.e., the subnet 2, the home agent (HA) of the subnet 2 transmits the network prefix to the mobile node MN. Subsequently, the mobile node MN receives the network prefix.

After receiving the network prefix, the mobile node MN creates a new COA having the network prefix in operation 701.

Then, the mobile node MN creates a DAD request message including the created COA and a previously-assigned domain name and multicasts (or broadcasts) the DAD request message to the subnet 2 in operation 702.

It is checked if the reply message to the DAD request message is received in operation 703. If the reply message is received, the mobile node MN determines that the IP address and/or domain name contained in the DAD request message are used in the subnet 2. Then, a new address is assigned to the mobile node MN by the DHCP server 211 in operation 704.

If the reply message is not received, the mobile node MN determines that the IP address and/or domain name contained in the DAD request message is not used in the subnet 2, registers the created COA in the mobile node MN in operation 705, and notifies the home agent (HA) of the subnet 1 of the COA to bind the COA with the home address of the mobile node MN.

Figure 8:
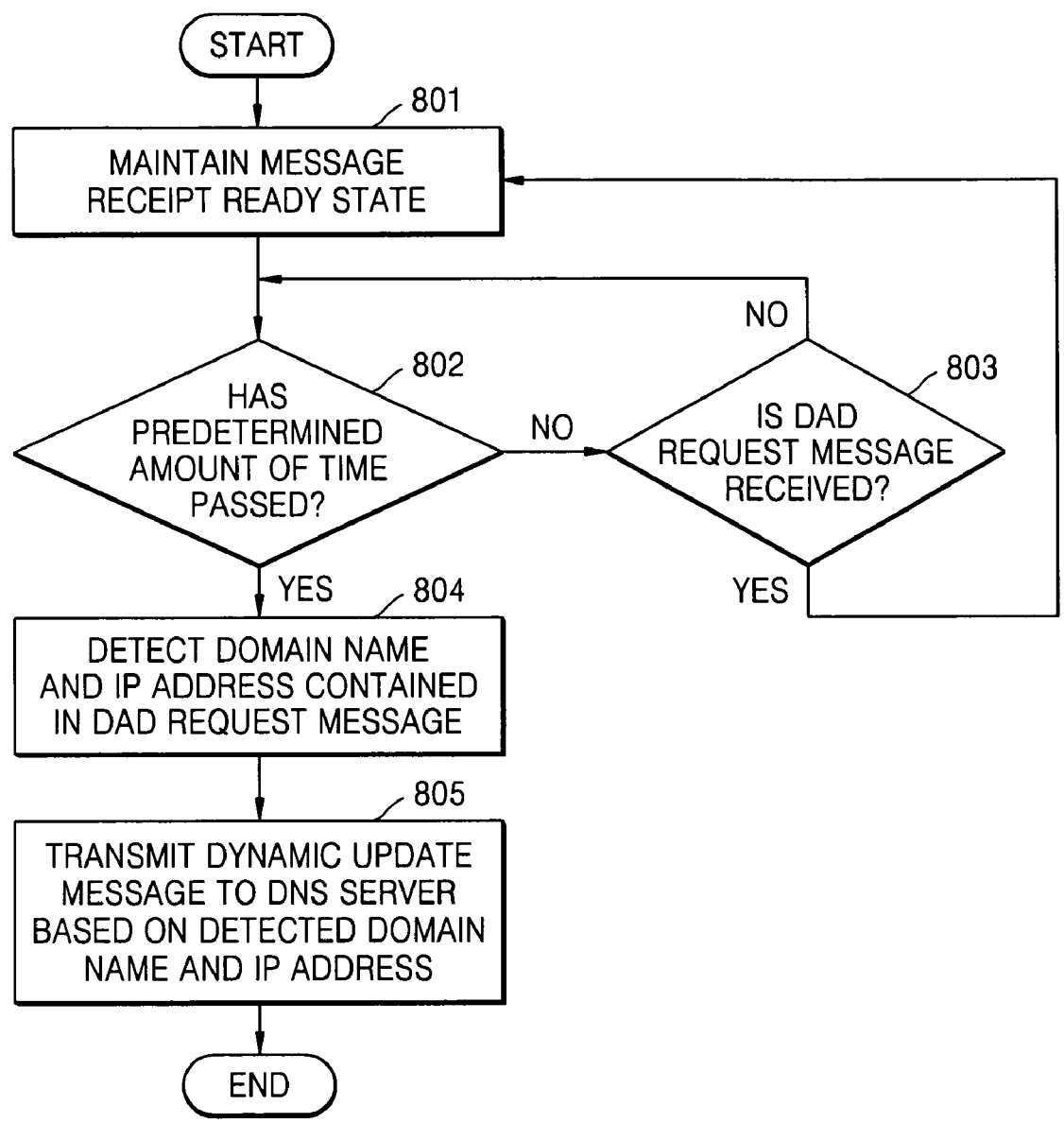
FIG. 8 is a flowchart of a DNDU method in a method for deleting tunneling in a connection between a mobile node (MN) and a correspondent node (CN) according to an embodiment of the present invention.

FIG. 8 is a flowchart of a DNDU method when the mobile node MN operates as shown in FIG. 7 in the network environment of FIG. 2.

In other words, after receiving the DAD request message from the mobile node MN, the DNDU server 210 maintains a message receipt ready state in operation 801.

After the message receipt ready state is set, it is checked if a predetermined amount of time has passed in operation 802. If the predetermined amount of time has not passed, the DNDU server 210 checks if another DAD request message is received in operation 803. Another DAD request message can be received when the mobile node MN multicasts the DAD request message and re-multicasts the DAD request message using a newly assigned address since the reply message to the DAD request message is received.

If another DAD request message is not received, the DNDU server 210 goes back to operation 802. However, if another DAD request message is received, the DNDU server 210 goes back to operation 801 and begins counting the time introduced by the message receipt ready state after the DNDU server 210 resets the message receipt ready state.

If the predetermined amount of time has passed in operation 802, the DNDU server 210 detects the domain name and IP address contained in the DAD request message. Such detection is performed in the same way as in the domain name and address detecting unit 303 of FIG. 3.

The DNDU server 210 transmits the dynamic update message to the DNS server 200 to update the domain name and IP address of the mobile node MN, registered in the DNS server 200, based on the detected domain name and IP address.

Figure 9:
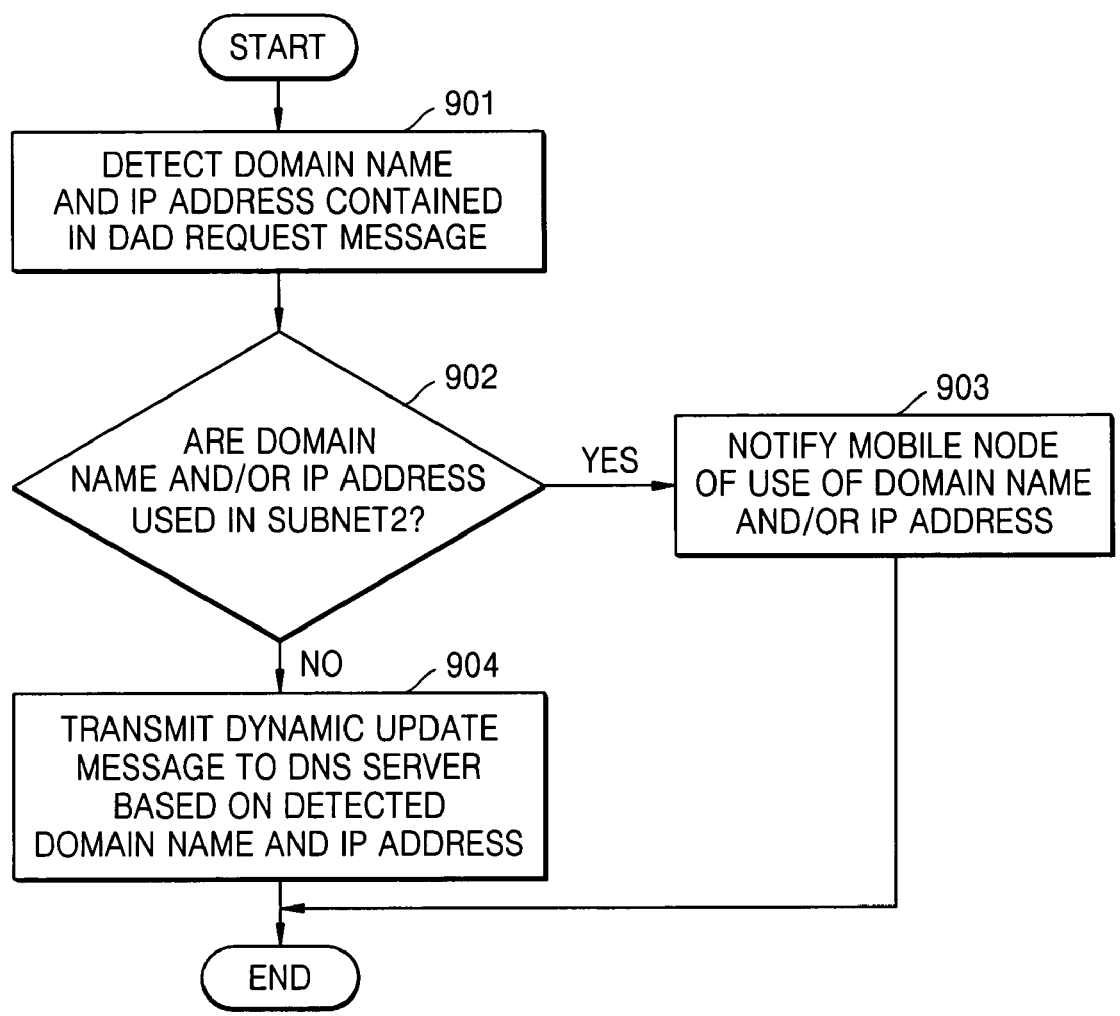
FIG. 9 is another flowchart of a DNDU method in a method for deleting tunneling in a connection between a mobile node (MN) and a correspondent node (CN) according to an embodiment of the present invention.

FIG. 9 is another flowchart of a DNDU method when the mobile node MN operates as shown in FIG. 7 in the network environment of FIG. 2.

That is, once receiving the DAD request message from the mobile node MN, the domain name and IP address contained in the received DAD request message are detected in operation 901.

It is checked if the detected domain name and/or address are used in the subnet 2 in operation 902. For such checking, domain names and addresses of a plurality of mobile nodes (not shown) connected to the subnet 2 are previously registered in the DNDU server 210. Thus, the DNDU server 210 checks if the detected domain name and/or IP address are included in the domain name and address that are previously registered.

If the detected domain name and IP address are used, the DNDU server 210 notifies the mobile node MN of duplicate use of the domain name and/or IP address in operation 903.

However, if the detected domain name and/or IP address are not used, the DNDU server 210 transmits a dynamic update message to the DNS server 200 based on the detected domain name and IP address in operation 904. Subsequently, the DNS server 200 updates the domain name and IP address of the mobile node MN.

Figure 10:
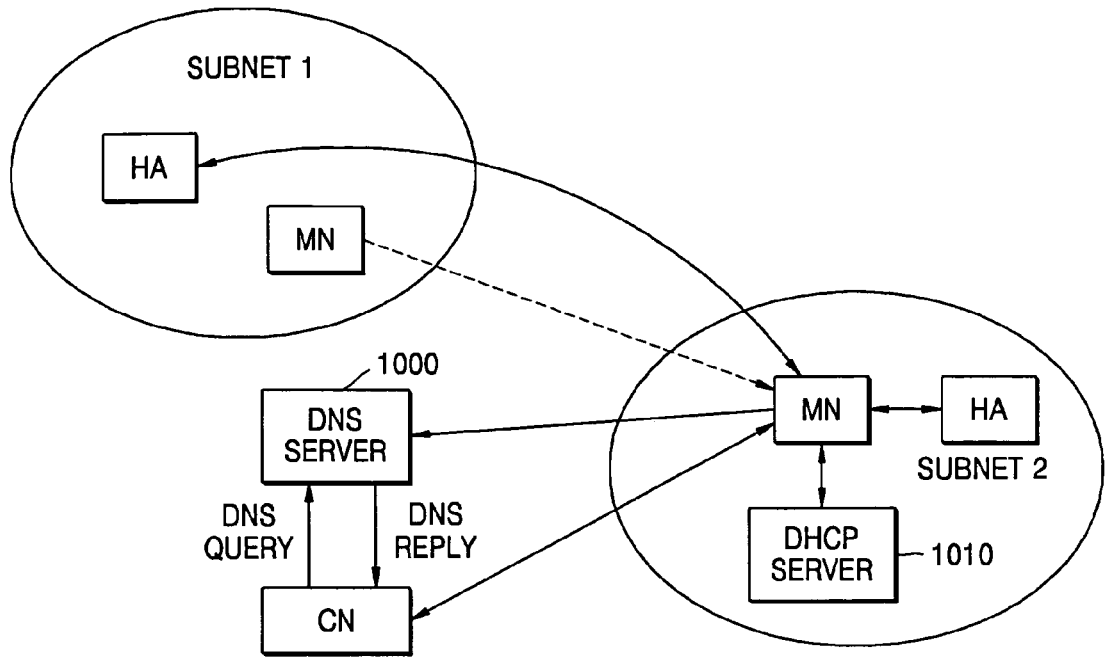
FIG. 10 illustrates a network environment to which another embodiment of the present invention is applied.

FIG. 10 illustrates a network environment to which another embodiment of the present invention is applied. The subnet 1 of FIG. 10 is a home network of a mobile node MN, and a subnet 2 of FIG. 10 is a different network or a foreign network of the mobile node MN. A correspondent node CN is a new correspondent node that desires to connect to the mobile node MN. A DNS server 1000 is identical to the DNS server 200 of FIG. 2. A DHCP server 1010 is identical to the DHCP server 211 of FIG. 2.

In contrast to FIG. 2, in FIG. 10, the mobile node MN directly updates its own domain name and IP address registered in the DNS server 1000. Thus, the DNDU server 210 is not present in the network environment of FIG. 10.

Figure 11:
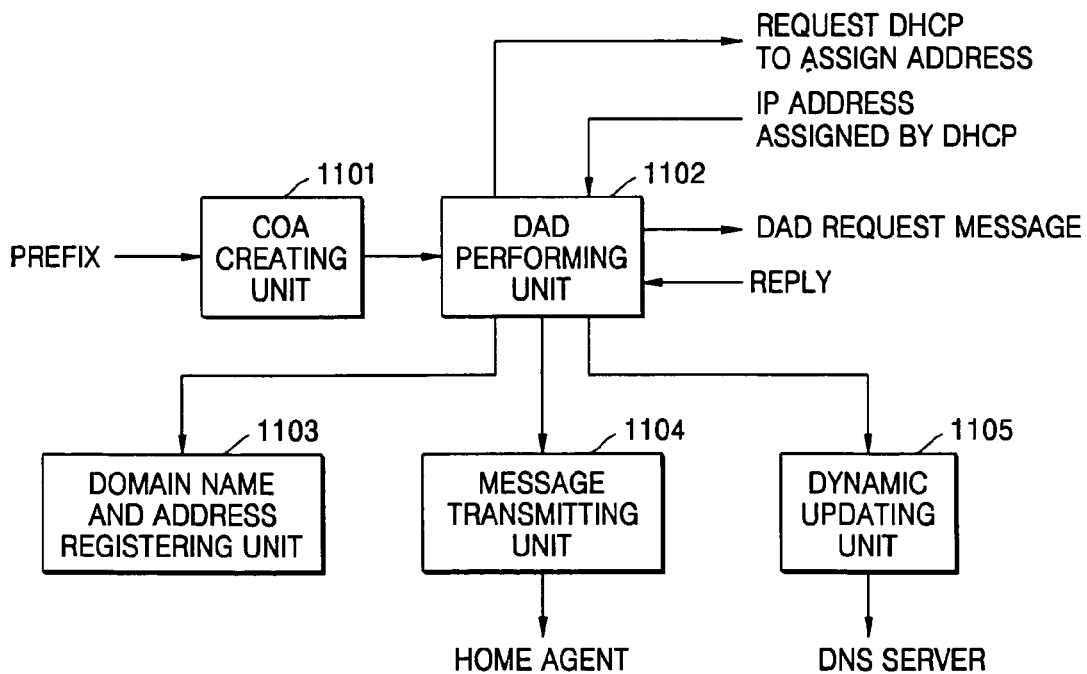
FIG. 11 illustrates a configuration of a mobile node (MN) used in a system according to another embodiment of the present invention.

FIG. 11 illustrates a configuration of a mobile node MN used in a system operating in the network environment of FIG. 10.

Referring to FIG. 11, the mobile node MN includes a COA creating unit 1101, a DAD performing unit 1102, a domain name and address registering unit 1103, a message transmitting unit 1104, and a dynamic updating unit 1105.

The COA creating unit 1101, the DAD performing unit 1102, the domain name and address registering unit 1103, and the message transmitting unit 1104 are identical to the COA creating unit 501, the DAD performing unit 502, the domain name and address registering unit 503, and the message transmitting unit 504 of FIG. 5.

If the domain name and IP address are not used in the subnet 2, the DAD performing unit 1102 outputs the COA to the message transmitting unit 1104 while requesting the dynamic updating unit 1105 to perform dynamic update.

Then, the dynamic updating unit 1105 transmits the dynamic update message for updating the domain name and IP address of the mobile node MN, registered in the DNS server 1000, to the DNS server 1000 using the domain name and IP address. For transmitting the dynamic update message to the DNS server 1000, the dynamic updating unit 1105 can use a dynamic update protocol prescribed in a specification of Innovations in Education and Training International (IETI).

Figure 12:
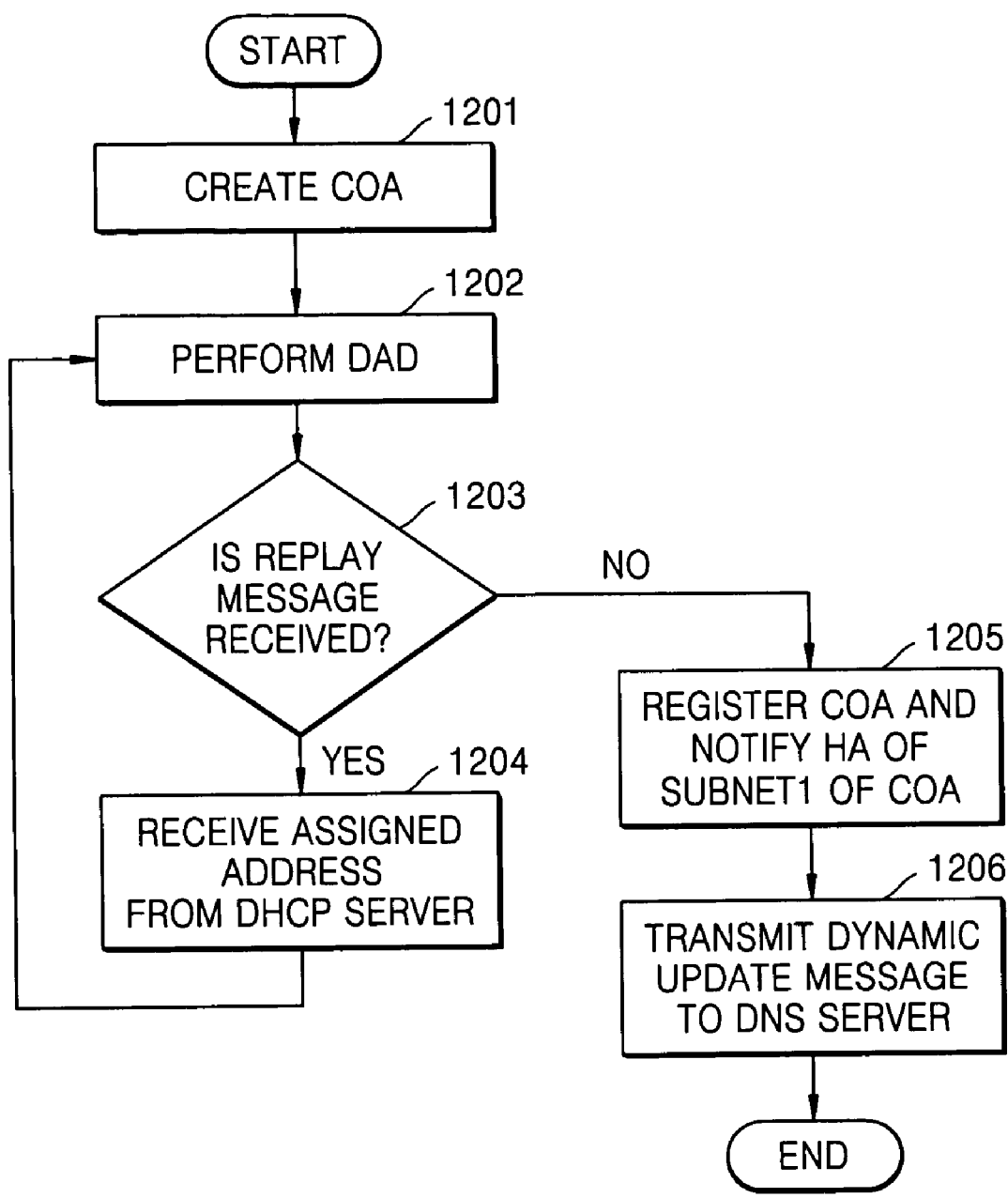
FIG. 12 is a flowchart of the operation of the mobile node (MN) in a method for deleting tunneling in a connection between a mobile node (MN) and a correspondent node (CN) according to another embodiment of the present invention.

FIG. 12 is a flowchart of the operation of the mobile node MN in a method for deleting tunneling in a connection between the mobile node MN and the correspondent node CN according to another embodiment of the present invention in the network environment of FIG. 10.

In other words, when the mobile node MN moves to the different network or the foreign network, i.e., the subnet 2 and receives a network prefix from a home agent (HA) of the subnet 2, the mobile node MN creates a new COA containing the network prefix in operation 1201.

The mobile node MN forms a DAD request message using the created COA and a previously-assigned domain name, multicasts the created DAD request message to the subnet 2, and performs DAD in operation 1202.

It is checked if a reply message to the multicasted DAD request message is received in operation 1203. If the reply message is received, the mobile node MN determines that corresponding IP address or/and domain name are used in the subnet 2. Consequently, a new address is assigned to the mobile node MN by the DHCP server 1010 in operation 1204. At this time, a new domain name also can be assigned to the mobile node MN.

If the reply message to the multicasted DAD request message is not received, the mobile node MN notifies a home agent HA of the subnet 1 of the created COA while registering the created COA in the domain name and address registering unit 1103 in operation 1205. Thus, the home agent HA of the subnet 1 binds the created COA with the home address of the mobile node MN.

The mobile node MN transmits a dynamic update message to the DNS server 1000 based on the created COA that is not used in the subnet 2 and the domain name. Thus, the domain name and IP address of the mobile node MN, registered in the DNS server 1000, are dynamically updated.

Once the new correspondent node CN of FIG. 10 sends the DNS query message to the DNS server 1000 to connect to the mobile node MN of FIG. 10, the DNS server 1000 provides the correspondent node CN with the DNS reply message having an IP address corresponding to the current location of the mobile node MN. Subsequently, the correspondent node CN of FIG. 10 directly transmits a packet to the mobile node MN.

The above-described embodiments show a home network and one foreign network (or one different network), but, in practice, a plurality of foreign networks (subnet 2) is present in a network. Thus, whenever the mobile node MN moves from a foreign network to another foreign network, a domain name and an IP address of the mobile node MN, registered in the DNS server, are dynamically updated.

As described above, the present invention dynamically updates a domain name and an IP address of a mobile node MN, managed by a DNS server, by a DNDU server or the mobile node MN, thereby a new correspondent node CN directly transmitting a packet to the mobile node MN when the new correspondent node CN attempts to connect to a mobile node MN that moves to a foreign network.

As a consequence, it is possible to avoid home agent's interception of the packet transmitted by the new correspondent node CN and tunneling of the packet to the mobile node MN from a mobile communication network and minimize route optimization process between the mobile node MN and the correspondent node CN, thereby effectively transmitting a packet when a new correspondent node CN desires to connect to a mobile node that moves to a foreign network.

While the present invention has been particularly shown and described with reference to exemplary embodiments thereof, it will be understood by those of ordinary skill in the art that various changes in form and details may be made therein without departing from the spirit and scope of the invention as defined by the appended claims and their equivalents.

What is claimed is:

1. A domain name dynamic update server which can be connected to a domain name service server and one or more mobile nodes, the domain name dynamic update server comprising:

a message receiving unit receiving a duplicate address detection request message that is generated from a first mobile node when the first mobile node moves to a different network;

a duplicate use determining unit determining whether a domain name or an address contained in the duplicate address detection request message is used in the different network; and an updating unit updating the domain name or the address of the first mobile node that is registered in the domain name service server if the domain name or the address are not used in the different network.

2. The domain name dynamic update server of claim 1, which the duplicate use determining unit determines that the domain name or the address can be used in the different network if another duplicate address detection request message is not received by the message receiving unit until a predetermined amount of time passes after the duplicate address detection request message is received.

3. The domain name dynamic update server of claim 2 further comprising a registering unit in which domain names and addresses of all mobile nodes connected to the different network are registered,
   wherein the duplicate use determining unit detects the domain name or the address from the duplicate address detection request message, checks if the detected domain name or address is registered in the registering unit, and determines whether the domain name or the address is used in the different network based on a checking result.

4. A mobile node which can be connected to a domain name service server, the mobile node comprising:
   an address creating unit creating an address having a prefix of a different network when the mobile node moves to the different network;
   a duplicate address detection performing unit, after receiving the address from the address creating unit, forming a duplicate address detection request message using a predetermined domain name and the address, multicasting the duplicate address detection request message to the different network, and determining whether the address is used in the different network; and
   a dynamic updating unit, if the address is not used in the different network, updating an address of the mobile node registered in a domain name service server using the predetermined domain name and the address.

5. The mobile node of claim 4, wherein the duplicate address detection performing unit determines that the address is not used in the different network if a reply message to the duplicate address detection request message is not received until a predetermined amount of time passes after multicasting the duplicate address detection request message to the different network.

6. A system for deleting tunneling in a connection between a mobile node and a correspondent node, the system comprising:
   a domain name service server managing domain names and addresses of a plurality of mobile nodes;
   a first mobile node;
   a domain name dynamic updating server, when a message including an address created by the first mobile node is received as the first mobile node moves to a different network, updating an address of the first mobile node that is registered in the domain name service server. using a domain name and the address included in the received message; and
   a correspondent node obtaining the updated address of the first mobile node from the domain name service server and transmitting a packet to the mobile node using the obtained address,
   wherein the domain name dynamic update server performs the updating, if the address contained in the received message is not used in the different network.

7. The system of claim 6, wherein the first mobile node multicasts the duplicate address detection request message including the address created by the first mobile node to the different network.

8. A system for deleting tunneling in a connection between a first mobile node and a correspondent node, the system comprising:
   a domain name service server managing domain names and addresses of a plurality of mobile nodes;
   the first mobile node updating an address of the first mobile node registered in the domain name service server using a predetermined domain name and an address created by the first mobile node by moving the first mobile node to a different network; and
   a correspondent node obtaining the updated address of the first mobile node from the domain name service server and transmitting a packet to the first mobile node using the obtained address,
   wherein the first mobile node performs the updating, if the address created by the first mobile node is not used in the different network.

9. A method for updating a domain name and an address of a mobile node in a network which includes one or more mobile nodes and a domain name service server, the method comprising:
   receiving a duplicate address detection request message that is generated from a first mobile node as the first mobile node moves to a different network;
   determining whether a domain name or an address contained in the duplicate address detection request message is used in the different network; and
   updating the domain name and the address of the first mobile node that are registered in a domain name service server using the domain name and the address contained in the duplicate address detection request message, if the domain name or the address is not used in the different network.

10. The method of claim 9, wherein the domain name and the address contained in the duplicate address detection request message are a domain name and an address which are not used in the different network, if another duplicate address detection request message is not received until a predetermined amount of time passes after the duplicate address detection request message is received.

11. The method of claim 10, wherein determination of use of the address comprises:
    detecting the address and the domain name contained in the duplicate address detection request message;
    checking if the detected address or domain name is included in previously registered addresses and domain names of mobile nodes connected to a different network; and
    determining that the detected address and domain name are not used in the different network if the detected address or domain name is not included in the previously registered addresses and domain names.

12. A method for deleting tunneling in a connection between a mobile node and a correspondent node, the method comprising:
    creating an address of the mobile node having a prefix of a different network when the mobile node moves to the different network;
    updating the address and the domain name of the mobile node that are registered in a domain name service server using the created address and a previously assigned domain name of the mobile node;
    obtaining the updated address from the domain name service server by the correspondent node;
    transmitting a packet from the correspondent node to the mobile node using the obtained address; and
    checking if the address created by the mobile node and the previously-assigned domain name are used in the different network,
    wherein updating the address and the domain name comprises performing the updating using a dynamic update protocol if the created address or the previously-assigned domain name is not used in the different network.

* * * * *